(12) United States Patent
Satchell, Jr.

(10) Patent No.: US 7,128,885 B2
(45) Date of Patent: Oct. 31, 2006

(54) NF3 PRODUCTION REACTOR

(75) Inventor: Donald P. Satchell, Jr., Chatham, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 473 days.

(21) Appl. No.: 10/735,158

(22) Filed: Dec. 12, 2003

(65) Prior Publication Data

US 2004/0120877 A1   Jun. 24, 2004

Related U.S. Application Data

(60) Provisional application No. 60/436,070, filed on Dec. 23, 2002.

(51) Int. Cl.
*C01B 21/06*   (2006.01)

(52) U.S. Cl. ....................... 423/406; 422/225

(58) Field of Classification Search ............... 422/225; 423/406
See application file for complete search history.

(56) References Cited

U.S. PATENT DOCUMENTS

| 4,091,081 | A  |   | 5/1978 | Woytek et al. |
|-----------|----|---|--------|---------------|
| 4,543,242 | A  | * | 9/1985 | Aramaki et al. ............. 423/406 |
| 4,661,318 | A  | * | 4/1987 | Jack et al. .................... 422/62 |
| 5,637,285 | A  |   | 6/1997 | Coronell et al. |
| 6,790,428 | B1 | * | 9/2004 | Tsirukis et al. .............. 423/483 |
| 6,908,601 | B1 | * | 6/2005 | Satchell et al. ............. 423/406 |
| 6,984,366 | B1 | * | 1/2006 | Syvret et al. ............... 423/406 |
| 6,986,874 | B1 | * | 1/2006 | Satchell et al. ............. 423/406 |
| 2002/0127167 | A1 |   | 9/2002 | Satchell, Jr. et al. |
| 2004/0013595 | A1 | * | 1/2004 | Kwon et al. ................. 423/406 |
| 2004/0096387 | A1 | * | 5/2004 | Syvret et al. ............... 423/406 |

* cited by examiner

*Primary Examiner*—Wayne A. Langel
(74) *Attorney, Agent, or Firm*—David A. Hey; Ira L. Zebrak

(57) ABSTRACT

A process for the production of nitrogen trifluoride by reacting fluorine gas and liquid ammonia acid fluoride in a first reaction zone having a relatively low energy input followed by treatment of the resulting reaction product in a second reaction zone having a relatively high energy input. The resulting crude nitrogen trifluoride product may be further treated with fluorine gas under elevated temperatures to improve yield of the desired product.

24 Claims, 1 Drawing Sheet

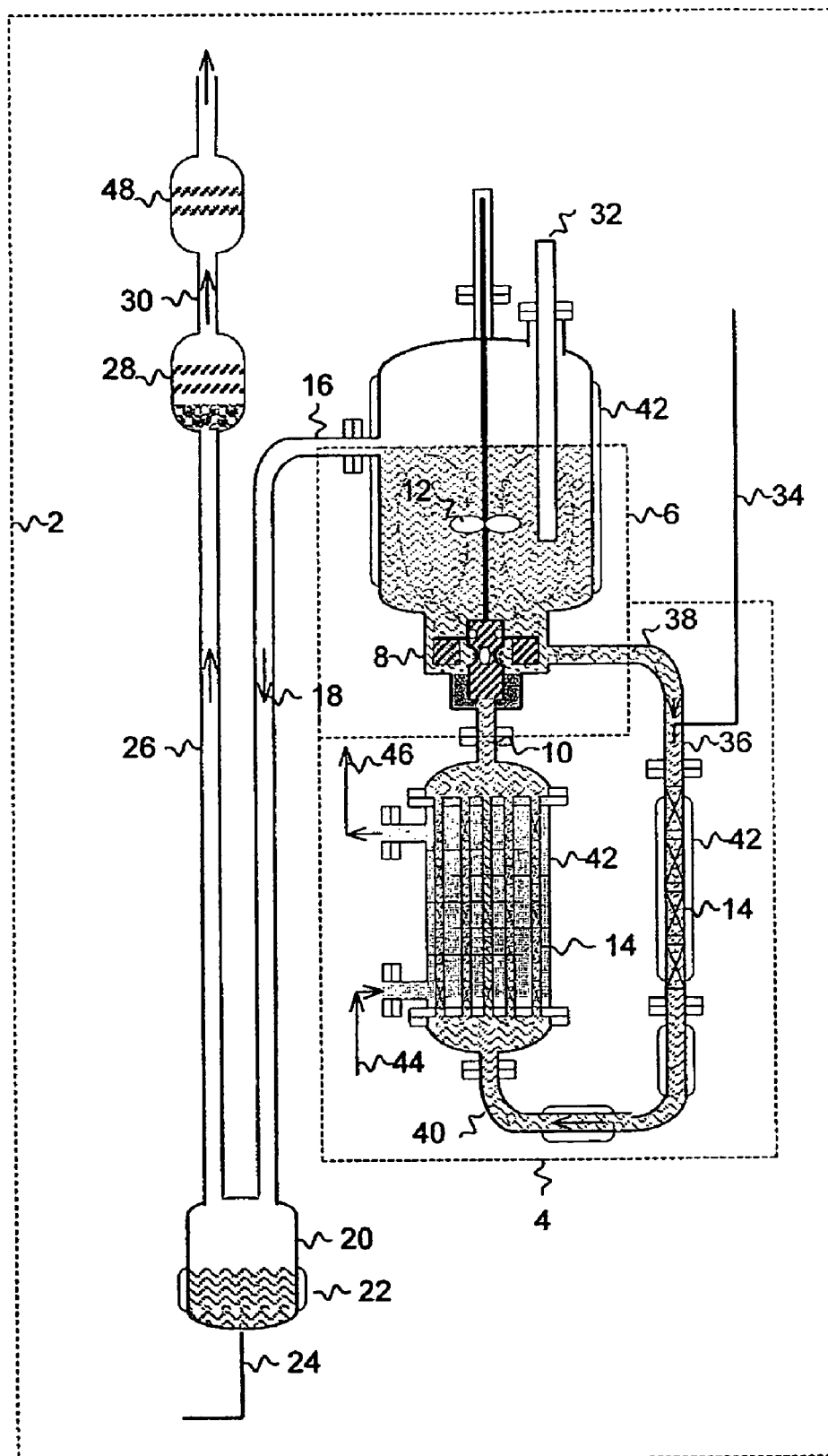

NF3 PRODUCTION REACTOR

CROSS REFERENCE TO RELATED APPLICATION

This application claims priority of U.S. Provisional Patent Application No. 60/436,070 filed on Dec. 23, 2002.

FIELD OF THE INVENTION

The present invention relates generally to nitrogen trifluoride and more particularly to a reactor system and a method for the production of nitrogen trifluoride from ammonia, elemental fluorine, and liquid ammonium acid fluoride.

BACKGROUND OF THE INVENTION

Nitrogen trifluoride ($NF_3$) has been employed for such products as high energy liquid and solid propellants and as a fluorine source for the production of semiconductor devices. Nitrogen fluoride can be prepared by a variety of processes such as disclosed in U.S. Pat. Nos. 4,091,081 and 5,637,285 and U.S. Patent Publication No. 2002/0127167 each of which is incorporated herein by reference. The production of nitrogen trifluoride generally results from a series of reactions as described below in which ammonia and fluorine gas are combined with a liquid ammonium acid fluoride intermediate.

Reaction 1 represents the desired $NF_3$ production reaction. Reaction 2 is the most rapid undesirable side reaction. Reaction 3 represents the fluorine gas that does not react.

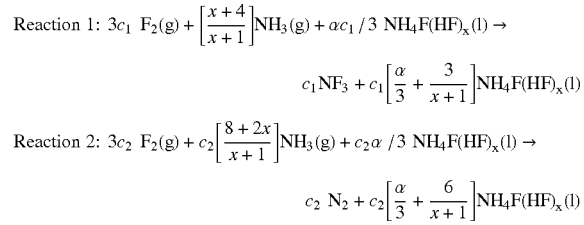

Reaction 3: $c_3\ F_2(g) \rightarrow c_3\ F_2(g)$

This simplified representation assumes that Reaction 1, Reaction 2, Reaction 3 are the only fluorine consuming reactions ($c_1+c_2+c_3=1$) and neglects slower, but important, fluorine reactions that produce $N_2F_2$ and $N_2F_4$, $OF_2$, and other impurities. The $c_1$ and $c_2$ values are the estimated fractions of the fluorine feed that react to produce respectively, the desired $NF_3$ product and the undesirable $N_2$ by-product. The $c_3$ fraction represents the fluorine gas that does not react. The $NH_4F(HF)_x$ melt acidity x value is the molar ratio of hydrogen fluoride to ammonia minus one in the melt. The $\alpha$ value is the ratio of the actual liquid ammonia acid fluoride melt [$NH_4F(HF)_x$] feed rate to the minimum stoichiometric $NH_4F(HF)_x$ feed rate. The temperature of the reaction zone is moderated by using excess $NH_4F(HF)_x$. This simplified process representation neglects other factors, e.g. the small fraction of HF in the crude $NF_3$ vapor product. Despite these limitations Reaction 1, Reaction 2, Reaction 3 provide a good framework to describe the state of the art for $NF_3$ production and the problems associated therewith as discussed below.

Efforts have been made to increase the conversion of $F_2$ to $NF_3$. U.S. Pat. No. 4,091,081 discloses the production of $NF_3$ by sparging fluorine and ammonia into liquid ammonium acid fluoride in a column. U.S. Pat. No. 5,637,285 discloses that simultaneously increasing the hydrogen fluoride content of the ammonium acid fluoride melt and increasing the mixing intensity increases the $F_2$-to-$NF_3$ conversion rate. In particular, increasing the $NH_4F(HF)_x$ melt acidity "x" value decreases the rate of Reaction 2 relative to Reaction 1 which tends to increase the overall $NF_3$ yield. However, higher $NH_4F(HF)_x$ melt acidity "x" values also somewhat decrease the rate of $NF_3$ production via Reaction 1 for a given interfacial surface area.

Although U.S. Pat. No. 5,637,285 achieves improvements in $NF_3$ yield, some significant problems remain. First, the highly exothermic $NF_3$ reaction is most rapid at the impeller tip, which causes localized overheating, accelerated corrosion at the impeller tip, and mechanical reliability problems. Second, one can not increase the solution depth, to increase the gas residence time, without increasing the mixing shaft length, which also increases mechanical reliability problems.

United States Patent Application Publication No. US/2002/0127167 A1 employs the advantages of higher mixing intensity as disclosed in U.S. Pat. No. 5,637,285 and higher circulation rate to increase the effective $\alpha$ value to decrease localized overheating, increase $F_2$-to-$NF_3$ conversion ($c_1$), and decrease the impeller corrosion. However, this approach does not address the issue concerning the impeller shaft length or the combination of high mixing rates and high fluorine concentration. In addition, the $NH_4F(HF)_x$ melt recirculation rate is limited by gaseous product flow rate and gas-liquid separation.

It would therefore be a significant advantage in the art to provide a $NF_3$ production system with improved yields without the problems associated with corrosion of the mixing assembly (e.g. impeller) due to the corrosive nature of the fluorine gas reactant and high shear rates.

SUMMARY OF THE INVENTION

The present invention is generally directed to the production of $NF_3$ by reacting fluorine gas, ammonia gas and liquid ammonium acid fluoride. The present invention provides a process in which low energy input is provided in vicinity of relatively high concentration of the corrosive reactant fluorine gas and higher energy input is provided in vicinity of relatively low concentrations of fluorine. As a consequence of the present invention, a $NF_3$ producing system is provided with improved yields of $NF_3$ without excessive corrosion of the mixing assembly. The balancing of energy input and fluorine concentration creates a reaction environment that is less conducive to corrosion. In particular, the aspect ratio of the reaction zones and the power input supplied to the reaction zones are selected to construct reaction zones in which conditions which tend to cause corrosion (e.g. high shear rates, high energy input, and high concentration of fluorine gas) are balanced with conditions that tend to favor low corrosion (low shear rates, low energy input, and low concentrations of fluorine gas).

The process is conducted in two reaction zones in which the first reaction zone is characterized by a relatively high aspect ratio and low power input and is the zone used to react fluorine gas at relatively high concentrations. The second reaction zone enables the process to proceed with a relatively low aspect ratio and high power input where the concentration of fluorine gas is relatively low because some of the fluorine gas has already reacted.

In a particular aspect of the present invention, there is provided:

A process for the production of $NF_3$ comprising:
a) reacting fluorine gas at an initial concentration and liquid ammonium acid fluoride in a first reaction zone in a relatively low energy environment to produce a first reaction product including $NF_3$ and at least some unreacted fluorine gas; and
b) reacting the first reaction product including the unreacted fluorine gas in a second reaction zone in a relatively high energy environment to produce a second reaction product, wherein the low energy environment in the first reaction zone and the high energy environment in the second reaction zone substantially convert the fluorine gas to $NF_3$ in a manner which at least substantially decreases corrosion in the first and second reaction zones due to the corrosive properties of the fluorine gas.

In a preferred embodiment of the present invention, an impurity gas formed as part of the process of producing $NF_3$ which contains at least the impurities $N_2F_4$ and $NH_4(HF)_x$ are reacted with fluorine gas at elevated temperatures to convert at least some of the impurity to $NF_3$ and essentially completely removing the impurity.

BRIEF DESCRIPTION OF THE DRAWINGS

The following drawing is illustrative of an embodiment of the invention and is not intended to limit the invention as encompassed by the claims forming part of the application.

The Drawing is a schematic view of one embodiment of the invention showing a dual reaction zone system and an optional assembly for treating impurity gas with a fluorine gas treating assembly.

DETAILED DESCRIPTION OF THE INVENTION

The present invention is directed to a process for producing $NF_3$ from a reaction mixture containing fluorine gas and liquid ammonium acid fluoride. As will be described below, the reaction is conducted in two reaction zones characterized as having different energy environments. The energy environment in the first reaction zone where the concentration of fluorine gas is relatively high is characterized as being a relatively low energy environment. The energy environment in the second reaction zone where the concentration of fluorine gas is less than the first reaction zone (i.e. because at least in part some of the fluorine gas has reacted in the first reaction zone) is characterized as being a relatively high energy environment.

The term "relatively high energy environment" shall mean a reaction zone in which reaction conditions and/or features of the reaction zone are selected to provide more energy at the location of the fluorine gas reactant than would appear in a relatively low energy environment. Exemplary reaction conditions and/or structural conditions include, but are not limited to, the power input provided to the reaction zone and the aspect ratio of the reaction zone. Generally, higher power inputs and lower aspect ratios favor high energy environments while lower power inputs and higher aspect ratios favor low energy environments.

In a particular aspect of the present invention, the two reaction zones are characterized as having different aspect ratios with different power inputs. In the initial low energy environment of the first reaction zone, the aspect ratio is relatively high while mixing is conducted at a relatively low energy input such as the pressure which is applied to the fluorine gas feed to mix the fluorine gas with the other reactants in the presence of static structured mixing assemblies in which mixing is accomplished in the absence of moving parts. In the high energy input reaction environment of the second reaction zone, the aspect ratio of the reaction zone is reduced and the power input is increased so that a mixing assembly typically including an impeller may be used to mix the reactants. The effect of the present process is to overcome difficulties in obtaining effective yields of the desired product ($NF_3$) from a reaction which is characteristically highly exothermic, involves corrosive reactants and typically employs a mixing assembly generating high shear. In particular, the reaction of the fluorine gas with liquid ammonium acid fluoride melt and ammonia gas with the liquid ammonium acid fluoride is conducted in a system that is designed to minimize reaction between gaseous ammonia and fluorine and contains a mixing assembly typically including an impeller. The high heat, corrosive reactants and high shear rates generated from the reaction typically damages any protective layers (e.g. fluoride layers) on the impeller. The combination of high heat, corrosive reactants and high shear rates associated with the process assembly rapidly corrodes the impeller causing shut down of the process assembly and lost production time to replace the impeller.

The present invention addresses the issue of impeller damage by conducting the process under conditions and in a manner which reduces and/or eliminates impeller damage.

As used herein the term "aspect ratio" refers to the ratio of the length of a reaction zone to the width of the reaction zone. Thus, for example, a reaction zone comprised of a cylindrical vessel having an aspect ratio of 2 will have a length twice as large as the width. Conversely, an aspect ratio of 0.5 refers to a reaction zone having a length which is one half the width. For a reaction zone composed of a conduit or channel or assembly of channels, the reaction zone aspect ratio is defined as the ratio of channel length to the channel hydraulic diameter. The hydraulic diameter for a channel or assembly of channels is defined as four times the channel cross sectional area divided by channel wall area per unit length.

The term "power input" refers to the mechanical energy input to either reaction zone, but not energy transferred between the reaction zones. Typically, a mixer, pump, or compressed gas is used to input power to either reaction zone. The power input is measured in terms of Watts per cubic meter of the total $NH_4F(HF)_x$ melt volume in the first and second reaction zones. In accordance with a particular aspect of the present invention, two reaction zones are provided, the first having a relatively high aspect ratio (i.e. the length of the reaction zone exceeds the width) and low power input (e.g. moderate pressure fluorine feed). A second reaction zone is provided which is essentially the converse of the first reaction zone in that the second reaction zone will have a relatively low aspect ratio and a relatively high power input.

Referring to the Drawing, there is shown a nitrogen trifluoride production system 2 having a first reaction zone 4 and a second reaction zone 6. In accordance with the present invention, the first reaction zone 4 is typically in the form of one or more conduits or channels having a relatively high aspect ratio typically within the range of from about 5 to 150, preferably from about 10 to 100. The second reaction zone typically has a low aspect ration of up to 5, typically about 1. The first reaction zone 4 has a relatively low power input of typically less than about 1000 Watts per cubic meter $NH_4F(HF)_x$, preferably less than 500 watts/m$^3$ and makes use of a static mixing of the reactants through the use of static mixing elements which are identified by the numeral 14 and include static mixing elements in the conduit 40. Static mixing elements including heat exchange capability are available under the trademark Kenics from Chemineer, Inc. The $NH_4F(HF)_x$ flow flux in the first reaction zone 4 is typically in the range of from 30 to 300 cm$^3$/cm$^2$/second, preferably from 50 to 200 cm$^3$/cm$^2$/second.

More power is inputted into the second reaction zone 6 and is sufficient to operate a dynamic mixer assembly 8. The dynamic mixer assembly 8 functions include decreasing the gas bubble size in the first reaction zone 4 product stream 10, recycling a portion of the first reaction zone 4 product stream 10 to the first reaction zone via stream 38, transferring a portion of the first reaction zone 4 product stream 10 to the mix tank of the second reaction zone to recover the nitrogen trifluoride product, and transferring a portion of the $NH_4F(HF)_x$ melt from the second reaction zone mix tank with a lower $NH_4F(HF)_x$ melt x value and lower gas concentration to first reaction zone 4 via stream 38. All of these functions can be performed by the impeller contained within the dynamic mixing assembly 8. Additional impellers 12 can be used to increase mixing within the second reaction zone mix tank. The dynamic mixing assembly 8 also provides a lesser quantity of energy input to the static mixer elements 14 in the first reaction zone 4.

The second reaction zone 6 is preferably in the form of a closed, upright cylindrical tank which in addition to the dynamic mixer assembly 8 includes a feed stream 10 from the first reaction zone 4.

The second reaction zone 6 also includes a crude nitrogen trifluoride gas product outlet 16 through which the crude nitrogen trifluoride gas product obtained from the second reaction zone 6 is sent for further treatment in an optional aspect of the present invention as hereinafter described.

The outlet 16 which enables aerated ammonium acid fluoride melt by-product to travel through a conduit 18 to an optional vessel 20 preferably fitted with a heating jacket 22 for assisting in the separation of the $NH_4F(HF)_x$ by-product from the crude $NF_3$ product 26. A substantial portion of the entrained $NH_4F(HF)_x$ crude nitrogen trifluoride product 26 can be advantageously removed using a conventional demister 28 to produce a substantially ammonium acid fluoride free crude nitrogen trifluoride product 30.

The second reaction zone 6 also includes an inlet 32 in the form of a conduit for transporting the starting material ammonia to the second reaction zone 6 from a source (not shown). Fluorine gas is provided to the nitrogen trifluoride production system 2 from a source (not shown) via a conduit 34 into a gas sparger 36. At the point the fluorine gas enters the first reaction zone 4, the ammonium acid fluoride velocity is sufficient to ensure that essentially all of the fluorine gas exits the first reaction zone 4 via feed stream 10.

The second reaction zone 6 is provided with an outlet 38 to enable recyclable ammonium acid fluoride to leave the second reaction zone 6 and recirculate into the first reaction zone 4 and eventually back to the second reaction zone 6 via feed stream 10. The pathway for the travel of the recycled ammonium acid fluoride is through a conduit 40 having one or more cooling jackets 42 with cooling fluid inlet 44 and outlet 46 to remove the large heat of reaction and control the reactor temperature. Both the first and second reaction zone temperatures are typically operated between 110 and 150° C., more preferably between 120 and 140° C.

The nitrogen trifluoride production system 2 can operate over a variety of conditions providing that the first reaction zone 4 is operated in a relatively low energy environment while the second reaction zone 6 is operated in a relatively high energy environment and therefore provides operating conditions most conducive to the production of $NF_3$ without excessive corrosion. In carrying out the production of nitrogen trifluoride, it is desirable that in the first reaction zone 4, at least 35% of the fluorine gas is converted to a first reaction product containing nitrogen trifluoride. Preferably, the conversion of fluorine gas to the first reaction product is at least 45%, most preferably at least 65%. The reaction of fluorine gas in the first reaction zone 4 reduces the concentration of fluorine gas in the second reaction zone 6 to enable the use of a higher energy environment therein including, for example, low aspect ratios for the reaction zone and a relatively high power input sufficient to operate the mixing assembly without undue corrosion.

It is desirable to employ a liquid $NH_4F(HF)_x$ melt acidity x value in the range of from about 1.2–2.2, preferably from about 1.4–2.0 and most preferably at a volume ratio of 1.6–1.8, equivalent to ammonium acid fluoride hydrogen fluoride to ammonia ratio ranges of 2.2–3.2:1, 2.4–3.0:1 and 2.6–2.8:1, respectively.

The crude nitrogen trifluoride product obtained from the outlet 16 will typically be under pressure at about 0.5 to 5 bar absolute, preferably 0.75 to 3 bar absolute and most preferably from about 1 to 2 bar absolute.

The invention as described above has several advantages over the prior art. The present invention avoids the accelerated corrosion associated by the combination of high fluorine concentrations and high sheer rates which is typical of prior art processes. Because the fluorine feed is first contacted with the liquid ammonium acid fluoride in a first reaction zone having a relatively low energy environment (e.g. low power input and high aspect ratio), corrosion in the first reaction zone is essentially avoided while a significant amount of fluorine is converted to the desired nitrogen trifluoride product (i.e. conversion rates typically greater than 35%). The second reaction zone can be used to maintain conversion of the fluorine gas despite the declining fluorine partial pressure without excessive corrosion rates. A substantial portion of bubbles containing fluorine gas and nitrogen trifluoride gas that are entrained by the dynamic mixing assembly 8 in the second reaction zone 6 can be advantageously recycled to the first reaction zone 4 to substantially increase the gas residence time without having to substantially modify the impeller such as by increasing its length.

In a further aspect of the present invention, the crude nitrogen trifluoride gas obtained from outlet 30 may be further treated to remove an impurity gas therefrom typically comprising $N_2F_4$ and $NH_4F(HF)_x$ melt alone or in combination with $N_2F_2$. The impurity gas from the outlet 30 is reacted with fluorine gas in a vessel 48 equipped with metal packing, preferably nickel packing. The reaction temperature will typically be in a range of from 200 to 400° C. with a gas residence time of about one second. These operating conditions remove essentially all the subfluorinated impurities [$N_2F_4$, $N_2F_2$, and $NH_4F(HF)_x$] and produce some nitrogen trifluoride.

The foregoing embodiments are illustrative of the invention and modifications and expansions of the invention within the routine skill of the art are encompassed by the present application.

What is claimed is:

1. A process for the production of $NF_3$ comprising:
   a) reacting fluorine gas at an initial concentration and liquid ammonium acid fluoride in a first reaction zone in a relatively low energy environment to produce a first reaction product including $NF_3$ and at least some unreacted fluorine gas; and
   b) reacting the first reaction product including the unreacted fluorine gas in a second reaction zone in a relatively high energy environment to produce a second reaction product, wherein the low energy environment in the first reaction zone and the high energy environment in the second reaction zone substantially convert the fluorine gas to $NF_3$ in a manner which at least substantially reduces corrosion in the first and second reaction zones due to the corrosive properties of the fluorine gas.

2. The process of claim 1 wherein the first reaction zone has a first power input and a first aspect ratio and the second reaction zone has a second power input higher than the first power input and a second aspect ratio lower than the first aspect ratio.

3. The process of claim 1 further comprising separating the $NF_3$ from the second reaction product.

4. The process of claim 2 wherein the first aspect ratio is from about 5 to 150.

5. The process of claim 4 wherein the first aspect ratio is from about 10 to 100.

6. The process of claim 2 wherein the first power input in the reaction zone is less than about 1,000 watts/per cubic meter of $NH_4F(HF)_x$.

7. The process of claim 6 wherein the first power input in the first reaction zone is less than about 500 watts per cubic meter of $NH_4F(HF)_x$.

8. The process of claim 2 wherein the second aspect ratio is up to about 5.

9. The process of claim 8 wherein the second aspect ratio is about 1.

10. The process of claim 2 wherein the second power input in the second reaction zone is at least 5,000 watts per cubic meter of $NH_4F(HF)_x$.

11. The process of claim 1 wherein the reaction of fluorine gas in the first reaction zone converts at least 35% of the fluorine gas to the first reaction product.

12. The process of claim 11 wherein the reaction of fluorine gas in the first reaction zone converts at least 45% of the fluorine gas to the first reaction product.

13. The process of claim 12 wherein the reaction of fluorine gas in the first reaction zone converts at least 65% of the fluorine gas to the first reaction product.

14. The process of claim 1 wherein the first power input in the first reaction zone is in part obtained from the introduction of the fluorine gas to the first reaction zone.

15. The process of claim 1 comprising conducting the reaction in the first and second reaction zones at a temperature of from about 110 to 150° C.

16. The process of claim 15 comprising conducting the reaction in the first and second reaction zones at a temperature of from about 120 to 140° C.

17. The process of claim 1 wherein the liquid $NH_4F(HF)_x$ melt acidity x value is from about 1.2–2.2.

18. The process of claim 17 wherein the melt acidity x value is from about 14–2.0.

19. The process of claim 18 wherein the melt acidity x value is from about 1.6–1.8.

20. The process of claim 1 wherein the first reaction product contains an impurity gas comprising $N_2F_4$, said process further comprising reacting the impurity gas with fluorine gas at an elevated temperature to convert at least some of the impurity gas to $NF_3$.

21. The process of claim 20 wherein the impurity gas comprises $N_2F_4$ and $N_2F_2$.

22. The process of claim 20 comprising reacting the impurity gas with fluorine gas at a temperature of 200 to 400° C.

23. The process of claim 1 wherein the first reaction zone includes a static mixing element.

24. The process of claim 1 wherein the second reaction zone includes a dynamic mixing assembly.

* * * * *